United States Patent [19]

Arbink et al.

[11] Patent Number: 4,707,328
[45] Date of Patent: Nov. 17, 1987

[54] FUEL ASSEMBLY FOR A NUCLEAR REACTOR

[75] Inventors: Richard Arbink; Olov Nylund, both of Västerås, Sweden

[73] Assignee: AB Asea-Atom, Västerås, Sweden

[21] Appl. No.: 797,298

[22] Filed: Nov. 12, 1985

[30] Foreign Application Priority Data

Nov. 12, 1984 [SE] Sweden .................... 8405640

[51] Int. Cl.⁴ .............................................. G21C 3/32
[52] U.S. Cl. ...................... 376/446; 376/448
[58] Field of Search ............. 376/448, 434, 446, 438

[56] References Cited

U.S. PATENT DOCUMENTS

| Re. 27,173 | 9/1971 | Lass et al. | 376/362 |
|---|---|---|---|
| 3,367,840 | 2/1968 | MacPhee | 376/440 |
| 3,697,375 | 10/1972 | Juvanto et al. | 376/440 |
| 3,809,610 | 5/1974 | Smith et al. | 376/448 |
| 3,928,126 | 12/1975 | Seim et al. | 376/440 |
| 4,304,635 | 12/1981 | Lippert et al. | 376/448 |
| 4,526,744 | 7/1985 | Borrman et al. | 376/446 |
| 4,560,532 | 12/1985 | Barry et al. | 376/446 |

FOREIGN PATENT DOCUMENTS

| 0142778 | 11/1984 | European Pat. Off. | |
| 1816561 | 8/1969 | Fed. Rep. of Germany . | |
| 2824265 | 12/1979 | Fed. Rep. of Germany | 376/448 |
| 3332854 | 3/1985 | Fed. Rep. of Germany | 376/448 |
| 1574351 | 6/1969 | France . | |
| 0111089 | 8/1979 | Japan | 376/448 |

Primary Examiner—Deborah L. Kyle
Assistant Examiner—Daniel Wasil
Attorney, Agent, or Firm—Pollock, Vande Sande & Priddy

[57] ABSTRACT

A fuel assembly for a boiling water reactor has a fuel channel of generally square cross-section and provided with four walls, which fuel channel surrounds a plurality of fuel rods. Adjacent to its upper edge, the fuel channel is provided with a spacer having a corner portion and two arms extending from the corner portion and making an angle of 90° with each other. The corner portion of the spacer engages a first corner of the fuel channel, and the two arms each make contact with the outer sides of the two fuel channel walls that meet at the first corner. Each arm is provided, at its outermost part, with a diagonally directed, horizontal projection which is inserted into a corresponding aperture in the adjacent fuel channel wall, the two projections thereby bridging across a respective one of the two corners of the fuel channel which are closest to the said first corner. The two projections rest on a lifting plate provided with a lifting handle and are each fixed to the plate by means of a fixing device which is releasable from above.

8 Claims, 18 Drawing Figures

FUEL ASSEMBLY FOR A NUCLEAR REACTOR

TECHNICAL FIELD

This invention relates to nuclear reactors, and in particular to fuel assemblies for nuclear reactors.

Discussion of Prior Art

U.S. Pat. No. Re. 27,173 describes a fuel assembly for a nuclear reactor, which fuel assembly comprises a plurality of fuel rods, a fuel channel of substantially square cross-section, a bottom tie plate means, a bottom part formed with a downwardly-facing inlet opening for cooling water, a spacer with a corner portion and two arms extending at 90° to each other horizontally from the corner portion and a lifting plate surrounded by the fuel channel and provided with a lifting handle. In this known fuel assembly the fuel rods are surrounded by the fuel channel and are supported from below by the bottom tie plate means which in turn is supported by the bottom part. The lifting plate is arranged in a tensile force-transmitting connection with the bottom tie plate means, and the spacer is arranged with the corner portion at a first corner of the fuel channel and with each of the arms extending along an outer side of the fuel channel adjacent to the first corner, the fuel channel being arranged in a mechanical connection with the lifting plate and in mechanical connection with the spacer.

In the fuel assembly known from U.S. Pat. No. Re. 27,173, the above-mentioned connection between the lifting plate and the fuel channel is brought about by providing the upper end of the fuel channel with four corner members, a respective one of which is fixed to each corner of the fuel channel. The corner members each bridge across the respective corner of the fuel channel and make contact with the upper end surface of a corresponding vertical extension fixed to the lifting plate. One of the corner members is used to support the above-mentioned spacer, the latter being fixed to the corner member by a bolt which passes through the spacer and corner member and which is screwed into a vertical hole provided in the end surface of the extension.

The provision of the above-mentioned corner members which bridge across each corner in the prior art fuel assembly, means that the fuel channel has to be slid down over an assembled array of the fuel rods and that during dismantling, the fuel rods cannot be removed until the fuel channel has been lifted clear. This means that the fuel channel cannot be fixed to the bottom part by means of horizontal, threaded bolts or the like, since the fixing means used must be releasable from above. When the walls of the fuel channel, after some time in the reactor core, have become deformed, as is to be expected, the walls become convex on their outer sides, and there is therefore a risk that the hydraulic connection required between the fuel channel and the bottom part may lose tightness which is undesirable for the proper operation of the reactor core.

OBJECT OF THE INVENTION

One object of this invention is to construct a fuel assembly of the kind described in the introductory part of this specification, in such a way as to eliminate the above-mentioned drawbacks.

SUMMARY OF THE INVENTION

According to the invention, mechanical connection between the spacer and the lifting means and between the spacer and the fuel channel is provided by means of two horizontal projections, one of which extends from each of the two arms of the spacer and each of which passes through a wall of the fuel channel. Each projection is directed parallel to an imaginary, vertical diagonal plane passing through the first corner of the fuel channel to which the spacer is attached. The projections are positioned for the most part inside the inner limiting surface of the fuel channel and are fixed to the lifting plate by a bolt or other mechanical connection means which is releasable from above the fuel assembly.

Desirably each projection passes through a respective first aperture formed in the respective walls of the fuel channel that extend away from the first corner and terminates in a respective second aperture formed in the respective adjacent walls of the fuel channel that are remote from the first corner.

Suitably each first and second aperture provides clearance above the projection located therein, to allow upward movement of the projections in the apertures before said projections engage the wall portions defining the respective upper edges of the said apertures.

Preferably the bottom part of the fuel assembly is fixed to the fuel channel by means of a plurality of horizontally directed fixing members.

BRIEF DESCRIPTION OF THE DRAWINGS

The invention will now be more fully described, by way of example, with reference to the accompanying schematic drawings, wherein.

DESCRIPTION OF PREFERRED EMBODIMENTS

In FIGS. 1-11, 1 designates a fuel channel having a substantially square cross-section. The fuel channel 1 surrounds, with no significant play, an upper, generally square portion of a bottom part 2 having a circular, downwardly-facing inlet opening 3 for cooling water and moderator water. In addition to the fuel channel 1, the bottom part 2 also carries a supporting plate 4. The lowermost part of the fuel channel 1 is provided with a relatively thick wall portion 1a which is fixed to the bottom part 2 and the supporting plate 4 by means of a plurality of horizontal bolts, indicated by means of dash-dotted lines 5.

The fuel channel 1 is divided into four vertical sub-channels 6 by means of a hollow channel member 7 having a cruciform cross-section which is welded at each end of the cross to a respective one of the four walls of the fuel channel 1. The channel member 7 thus defines four hollow wings 8. At its lower end, the channel member 7 is connected to an inlet tube 9 for moderator water. The sub-channels 6 each contain a sub-bundle of sixteen fuel rods 10. In addition, each sub-bundle contains a grid-like bottom tie plate 11, a grid-like top tie plate 12 and a plurality of spacers 13 (only one of which is shown) spaced apart in the axial direction of the fuel rods 10. The four bottom tie plates 11 are supported by the supporting plate 4, each being partially inserted into a square hole 14 therein. In each sub-bundle of fuel rods at least one of the fuel rods is made with relatively long, upper and lower threaded end plugs, the lower of which is passed through the bottom tie plate 11 and secured thereto with a nut 15 (see FIG. 1), and the upper of which is passed through the top tie plate 12 and secured thereto with a nut 16.

An upper end portion of the fuel channel 1 surrounds a cruciform lifting plate 17 having four horizontal arms 18, 18', 19, 19' which extend from a common central portion. At its outer end, each arm has a portion in the form of an arrow-head, which, in a respective corner of the fuel channel 1, makes contact with the inner wall surface of the fuel channel 1. A lifting handle 20 is fixed to the arms 19 and 19'. The lifting plate 17 and the handle 20 together form a solid lifting member of cast steel. The fuel channel 1 has two mutually identical, vertical lugs 21 and 21', respectively, which are located at the end portions of the arms 19 and 19' and which are each symmetrical about a vertical plane through a diagonal of the fuel channel. Further, the upper edge of the fuel channel 1 is located in a single horizontal plane. The end portions of the arms 18 and 18' are each provided on their upper sides with a respective horizontal projecting flange 22 and 22', each of which flanges rests against a corner portion of the fuel channel 1. The end portions of the arms 19 and 19' are each provided with a vertically extending through-hole 23 and 23', respectively, each of which has an upper portion of larger diameter and a threaded lower portion of smaller diameter. Four vertically extending throughholes 25 are provided in the mid-portion of the lifting plate.

Figure 1:
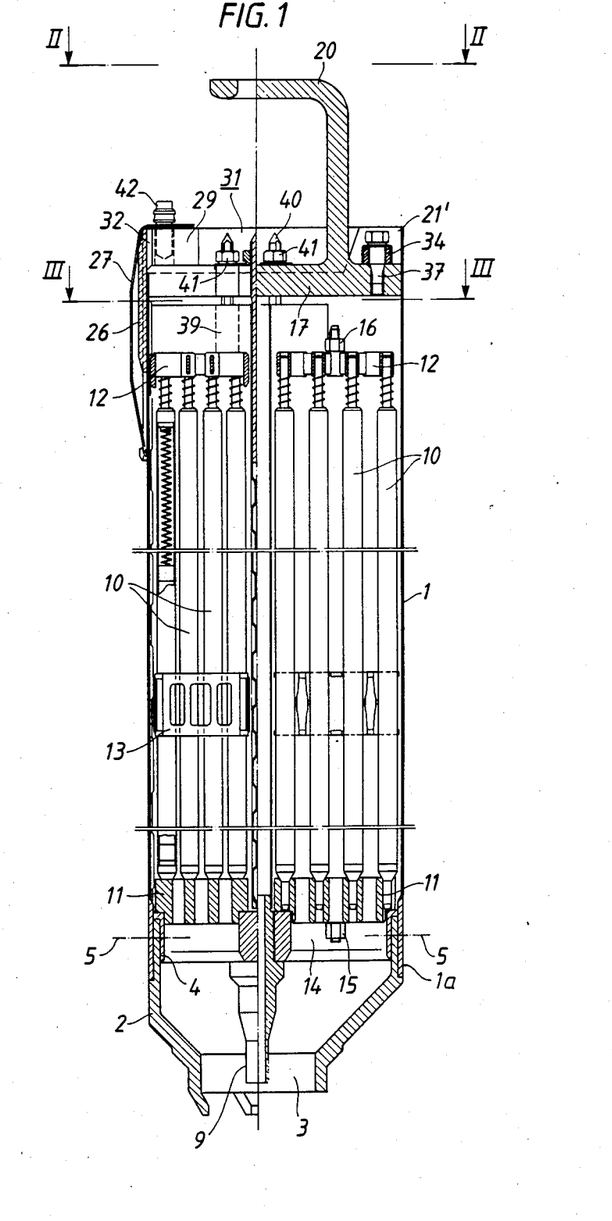
FIG. 1 shows a first embodiment of a fuel assembly according to the invention in vertical section along lines I—I in FIG. 2.
Figure 1A:
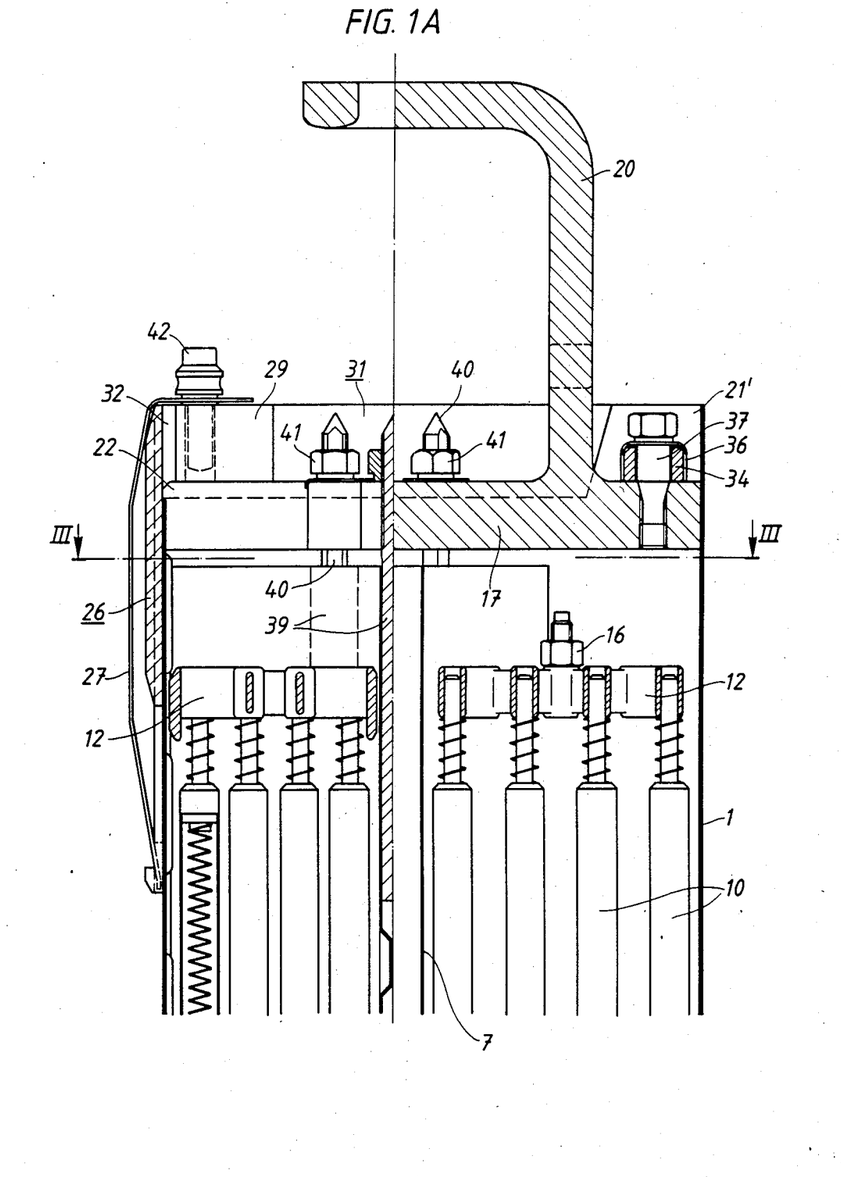
FIG. 1A shows a detail of FIG. 1 on an enlarged scale.
Figure 2:
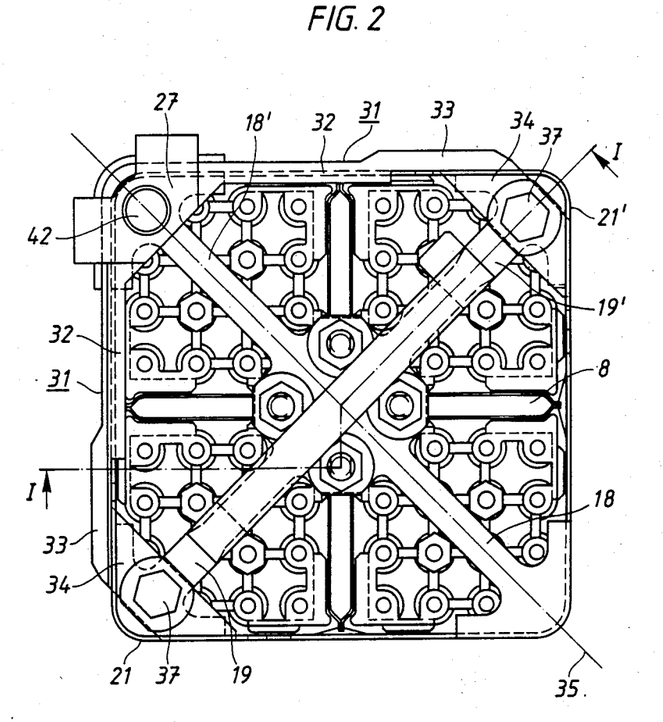
FIG. 2 shows the fuel assembly of FIG. 1 in a view perpendicular to a horizontal plane and taken along a line II—II in FIG. 1.
Figure 3:
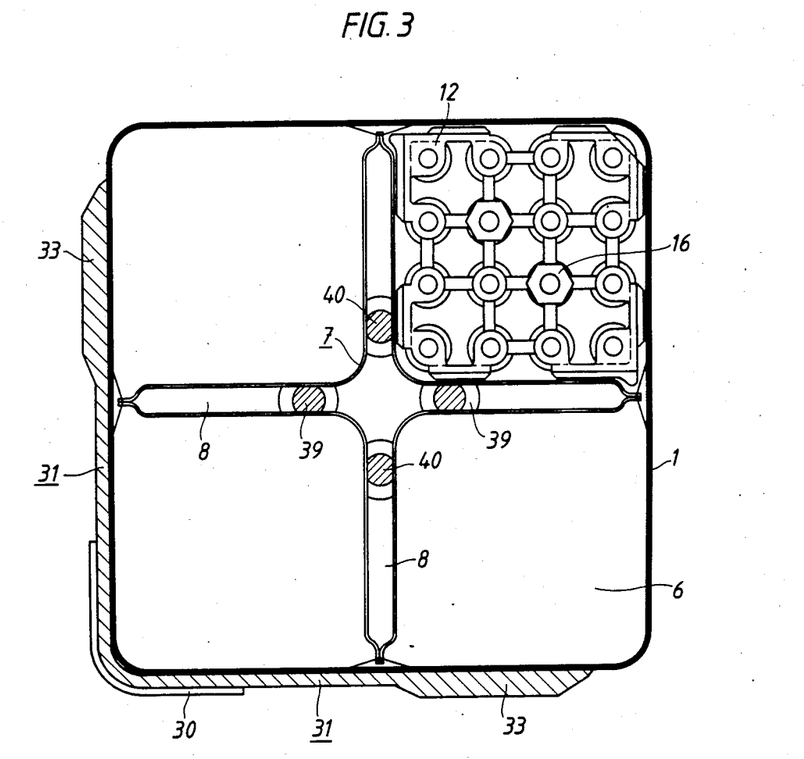
FIG. 3 shows a horizontal section along a line III—III in FIG. 1.
Figure 4:
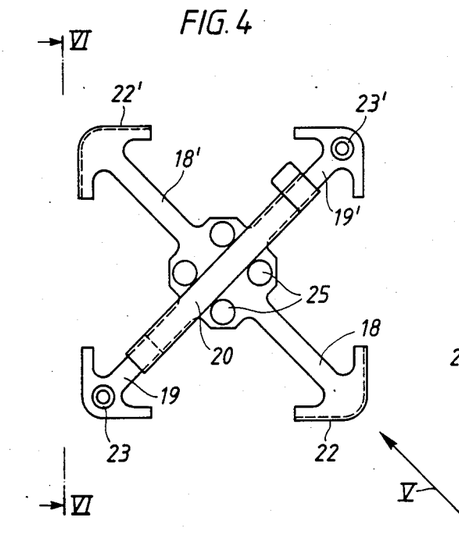
FIG. 4 shows a view from above of a lifting plate included in the fuel assembly shown in FIGS. 1-3.
Figure 5:
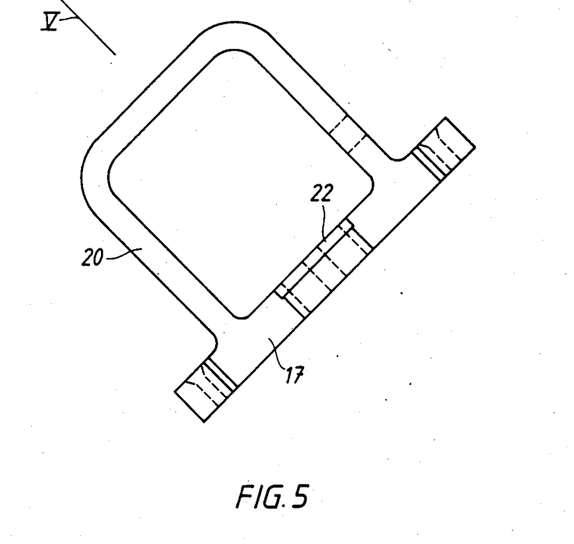
FIG. 5 shows the same lifting plate seen in the direction indicated by the arrow V in FIG. 4.
Figure 6:
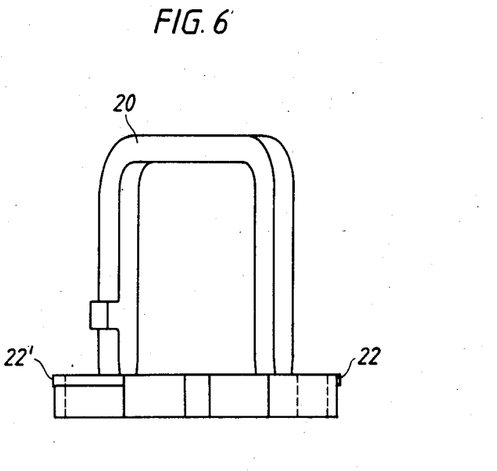
FIG. 6 shows the same lifting plate in a view perpendicular to a vertical plane through the line VI—VI in FIG. 4.

The fuel assembly shown in FIGS. 1-3 is provided with a solid cast spacer 26, the purpose of which is to set a minimum distance between fuel assemblies arranged adjacent each other. In addition, the spacer 26 serves as a fixing member for retaining the fuel channel 1 in relation to the lifting plate 17 and as an attachment for a spring member 27, which is arranged, with similar spring members on three other fuel assemblies, to press two outer sides of each fuel assembly 1 against adjacent sides 28 of a square core grid (see FIG. 11).

Figures 7, 8, 9, 10:
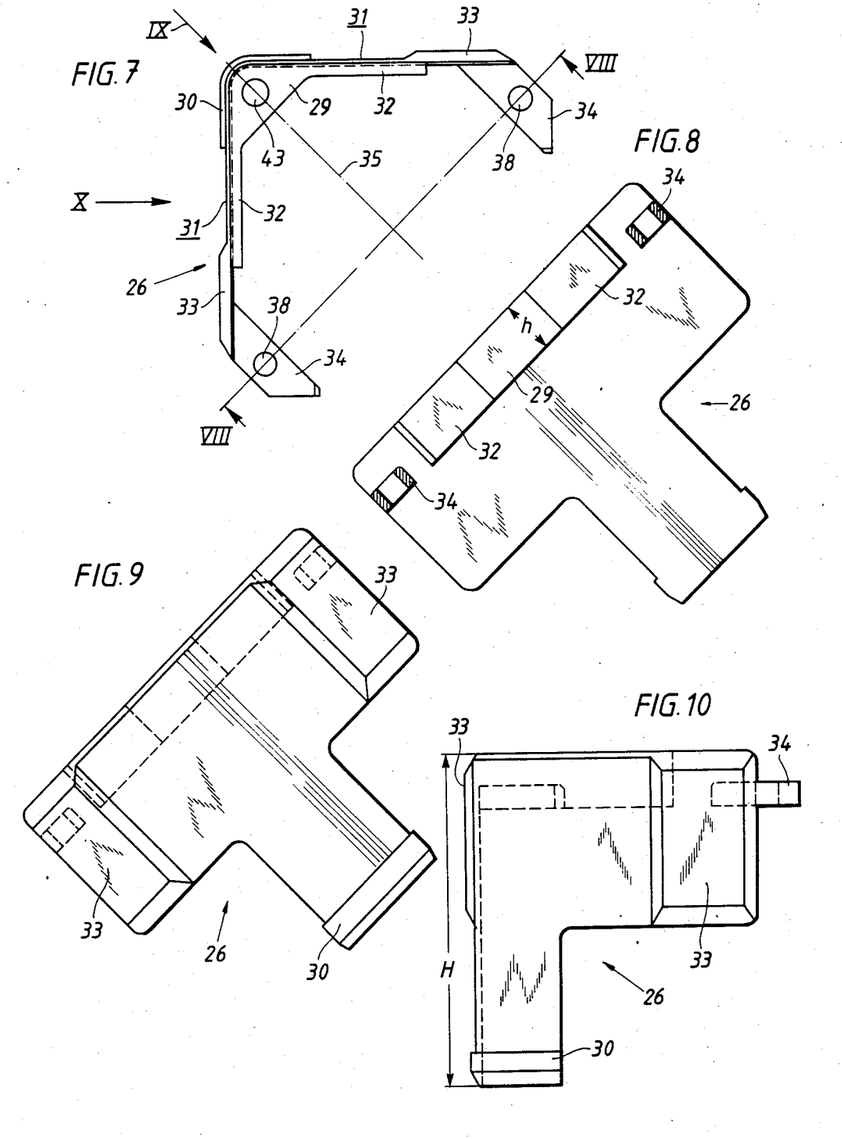
FIG. 7 shows a view from above of the spacer included in the fuel assembly shown in FIGS. 1-3.
FIG. 8 shows the spacer in a vertical section along line VIII—VIII in FIG. 7.
FIG. 9 shows a horizontal view of the spacer in the direction of the arrow IX shown in FIG. 7.
FIG. 10 shows the spacer in a horizontal view in the direction of the arrow X shown in FIG. 7.
Figure 11:
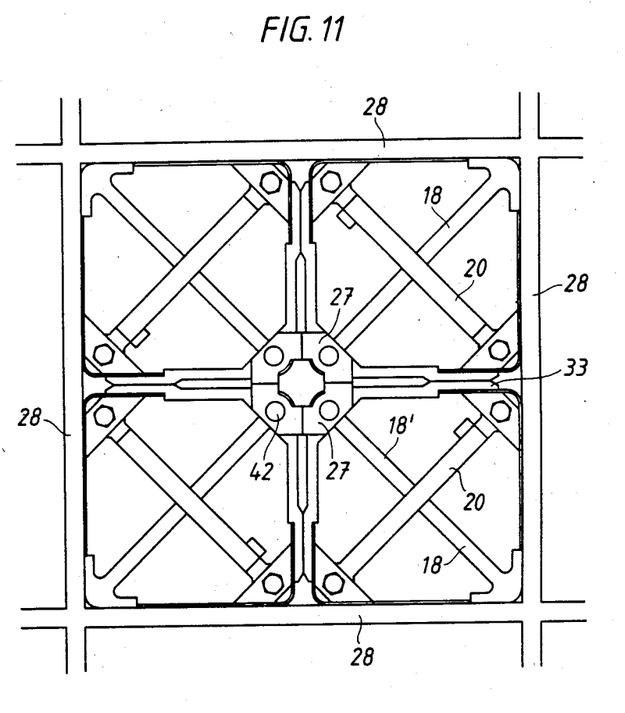
FIG. 11 shows a view from above of one module of a boiling water reactor core having four fuel assemblies designed according to FIG. 1 and positioned by means of spacers designed according to FIGS. 7-10.

The spacer 26 is provided at the top with a web portion 29 which, in plan, exhibits an approximately triangular shape and has a vertical dimension which is designated h in FIG. 8. The web portion 29 constitutes part of the corner region of the spacer 26, the total vertical dimension H of which (see FIG. 10) is approximately six times h. Along its lower extremity, the corner region exhibits a flange 30. From the corner region there extend two arms 31 of smaller vertical extent than the corner region, which, in plan, make an angle of 90° with each other. Each arm 31 includes an upper lip 32, which extends horizontally from the web portion 29 and which, in the same way as the web portion, is arranged to lie vertically above the upper edge of the fuel channel 1. Below the respective lip 32 each arm makes contact—along its entire horizontal extension—with the outer side of a corresponding wall of the fuel channel to which the spacer 26 is attached. At its outermost end, each arm 31 is formed with a relatively thick end portion 33, intended to serve as a distance block. From each end portion 33 there extends a corresponding horizontal projection 34 formed with rectangular cross-section. The projections 34 extend parallel to an imaginary vertical diagonal plane 35 (see FIG. 7) through the fuel channel 1. The imaginary vertical plane 35 constitutes a symmetry plane for the spacer 26.

The above-mentioned lugs 21 and 21' in the fuel channel 1 are each provided with two through-holes 36 for a corresponding projection 34, each projection 34—in a corresponding corner of the fuel channel 1—being inserted into the fuel channel 1 through one of the two holes 36 and arranged with an end portion in the other hole. In this way, a direct mechanical connection is obtained between the fuel channel 1 and the spacer 26. The projections 34 make contact with corresponding upwardly-facing surfaces of the arm 19 and 19', respectively, of the lifting plate 17 and are each fixed to the plate by means of a vertically-extending threaded bolt 37. Each bolt 37 is passed, with a certain play, through the hole 38 in the respective projection 34 and screwed into a corresponding hole 23 and 23', respectively, in the lifting plate 17.

The spacer 26 is thus mechanically connected to the fuel channel 1 and the lifting plate 17. The connections are sufficiently strong for transmitting the entire lifting force from the lifting plate 17 to the fuel channel 1 when the fuel assembly is raised. The necessary transmission of lifting force between the fuel channel 1 and the bottom part 2 is performed with the aid of the bolts 5.

In order to provide further security in the connection between the fuel channel 1 and the lifting plate 17, a vertical bar 39 is located in each hollow wing 8 of the cruciform channel member 7 and is welded thereto. At its upper end, each bar 39 has a vertically extending threaded portion 40 which is passed, with a certain play, through a corresponding hole 25 in the mid-portion of the lifting plate 17 and is fixed there with a nut 41. Alternatively, instead of the four bars 39, a single central bar can be used, the four holes 25 then being replaced by one central hole. The spring member 27 is fixed to the spacer 26 by means of a bolt 42, which is inserted into a corresponding hole 43 in the abovementioned triangular web portion 29.

When fuel rods are to be removed from the fuel assembly, the fuel assembly is moved to a special service pool, where the bolts 37 are loosened and removed. Then a diagonally directed horizontal force is applied to the spacer 26, the projections 34 being withdrawn from the holes 36 provided in the fuel channel wall, and the spacer being removed. When the nuts 41 have been loosened and removed, the lifting plate 17 can also be removed, so that the sub-bundles can be lifted and removed individually.

Figure 12:
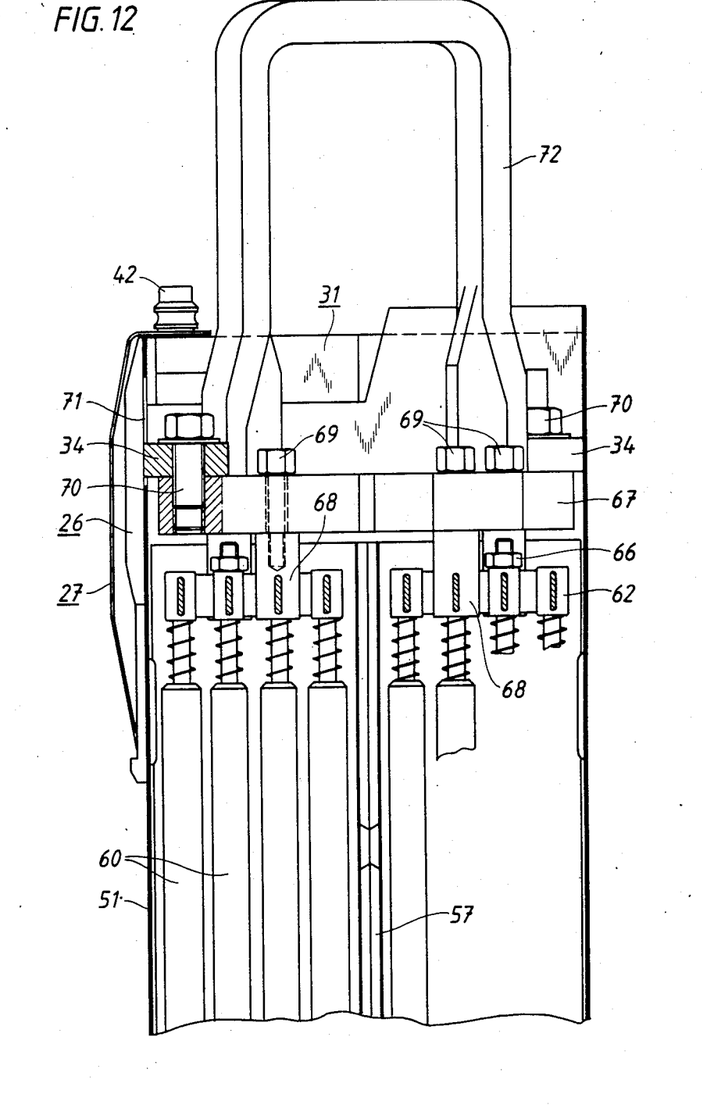
FIG. 12 shows in vertical section, along line XII—XII in FIG. 13, an upper portion of a fuel assembly according to a second embodiment of the invention.
Figure 13:
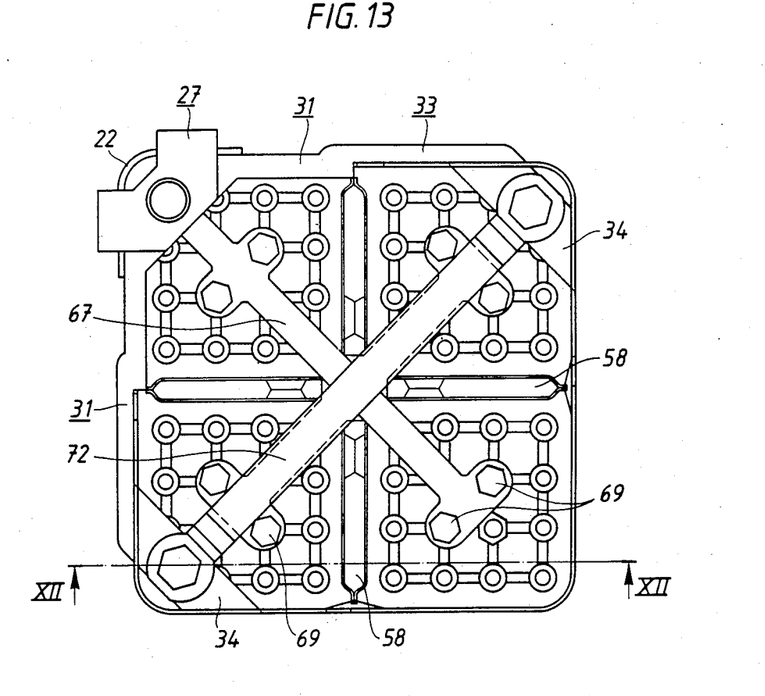
FIG. 13 shows the fuel assembly of FIG. 12 seen from above.
Figure 14:
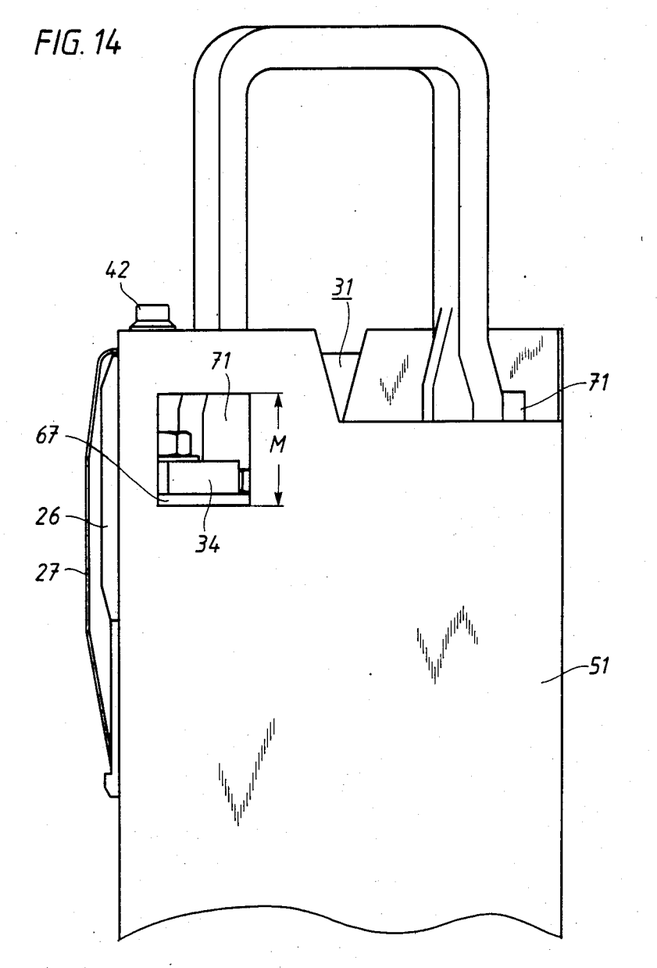
FIG. 14 shows an upper portion of the same fuel assembly of FIG. 12 in a horizontal side view.

In the second embodiment of fuel assembly shown in FIGS. 12–14, a spacer is used, which is designed in the same way as the spacer described above and has the same reference numeral 26. The part of the second embodiment of fuel assembly which is not shown in FIGS. 12–14, is designed in the same way as the corresponding portion of the assembly shown in FIGS. 1–3, i.e. in the same way as the corresponding portion of the assembly shown in the specification of co-pending U.S. patent application Ser. No. 632,074, now U.S. Pat. No. 4,632,804, filed on the July 18, 1984 in the names of Borrman, Mansson and Wallander and assigned to the assignee of this application. The disclosure of this co-pending application is herein incorporated by reference.

The same reference numerals have also been used for the parts of the spacers in the two embodiments. The fuel assembly shown in FIG. 12 has a fuel channel 51 of approximately square cross-section. The fuel channel 51 is divided into four sub-channels by means of a hollow cruciform channel member 57 having four hollow wings 58, each of said sub-channels including a subbundle containing sixteen fuel rods 60. Each sub-bundle has a bottom tie plate of the same design as that shown in FIG. 1, and a top tie plate 62. In each sub-bundle, two of the fuel rods are constructed with relatively long upper end plugs and lower end plugs. These plugs are passed through the top tie plate and the bottom tie plate, respectively, and secured there with nuts. The nuts for the upper end plugs are designated 66. Each top tie plate 62 is integrally provided with two, upwardlydirected and mutually identical projections 68. A cruciform lifting plate 67 makes contact with the upper end surfaces of the projections 68 and is fixed to the top tie plates by means of four threaded bolts 69, which each pass through a hole in the lifting plate 67 and are screwed into a threaded hole in the respective projection 68. A lifting handle 72 is cast integrally with the lifting plate 67.

In a manner similar to that shown in FIGS. 1–3, the horizontal projections 34 of the spacer 26 each make contact with an upwardly-facing surface of the lifting plate 67. The projections 34 are each fixed to the lifting plate 67 by means of a bolt 70, which is screwed into the lifting plate 67. In a manner similar to that shown in FIGS. 1–3, the projections 34 are arranged in direct mechanical connection with the fuel channel 51 by the provision of two holes (71) in each side surface of the fuel channel 51, which two holes at each corner of the fuel channel 51 surround the projections 34. The holes 71 are dimensioned in such a way that a large vertical gap occurs in the mechanical connection between the horizontal projections 34 and the fuel channel 51. The play is greater than 40 mm, preferably greater than 80 mm. The reason for the provision of such a large play, resides inthe fact that the length of fuel rods increases considerably after use in a reactor core. Since the top tie plates 62 are arranged in a rigid mechanical connection with the lifting plate 67, it is an absolute necessity for the plate 67 to be able to move outwards; otherwise, the fuel rods would become bent. Each hole 71 (see FIG. 14) preferably has an axial dimension M which is at least twice as large, preferably at least three times as large as the vertical dimension of a portion—surrounded by the hole 71—of a projection 34. When applying a lifting force to the handle 72, initially only the liftng plate, the spacer and the four sub-bundles are lifted. When the projections 34 have moved up into contact with the upper edges of the holes 71, the fuel channel 51, with the bototm part attached thereto, is lifted. When the fuel rods are to be lifted out, the spacer 26 is first removed, whereupon all the sub-bundles can be lifted out of the fuel channel 51 simultaneously by means of a lifting force applied to the handle 72.

Figure 15:
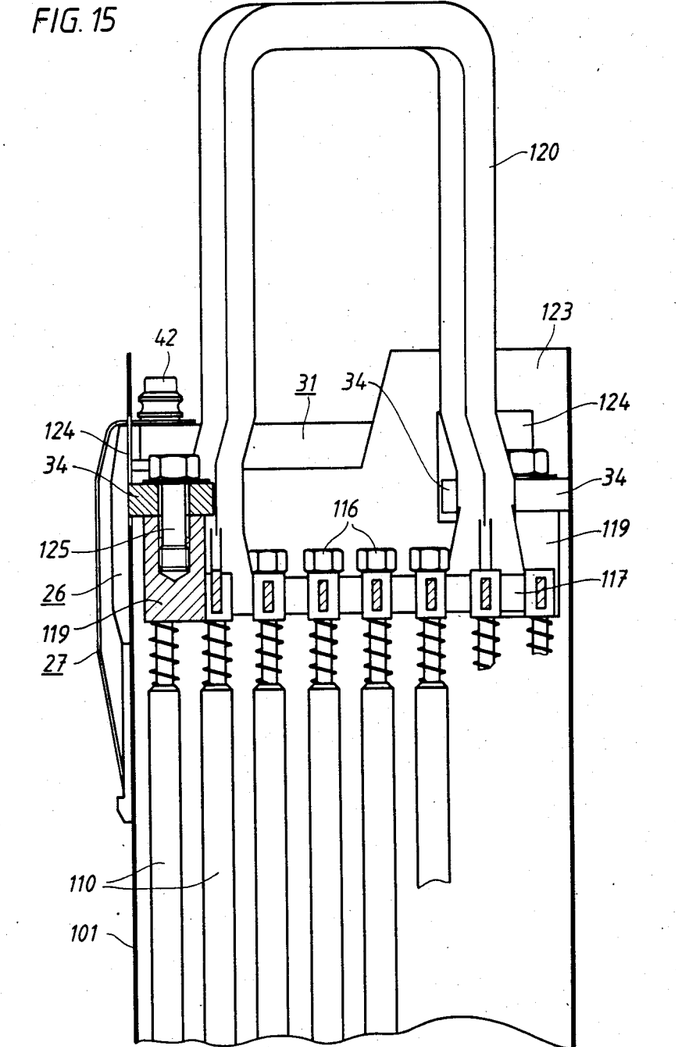
FIG. 15 shows a vertical section along line XV—XV in FIG. 16 of an upper portion of a fuel assembly according to a third embodiment of the invention.
Figure 16:
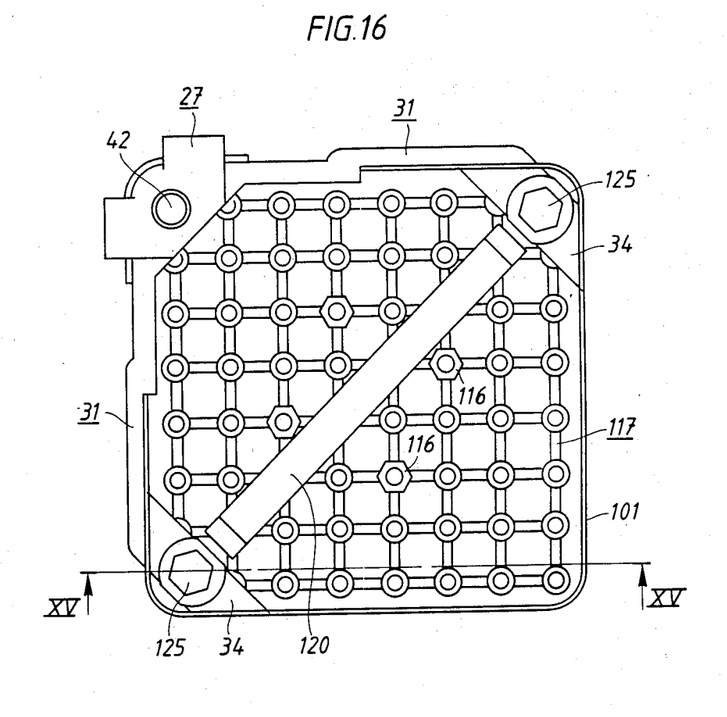
FIG. 16 shows the fuel assembly shown in FIG. 15 in a plan view from above.
Figure 17:
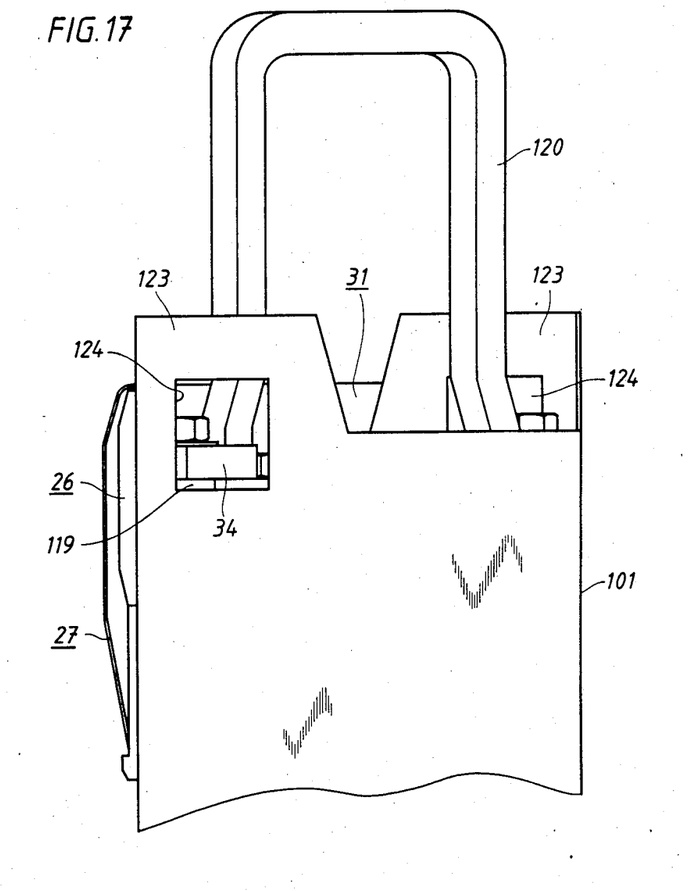
FIG. 17 shows an upper portion of the fuel assembly of FIG. 15 in a horizontal side view.

The spacer 26 described above is also used with the third embodiment of fuel assembly shown in FIGS. 15–17. This third embodiment has a plurality of fuel rods 110, which are enclosed within an approximately square cross-section fuel channel 101. The fuel assembly has a generally square grid-like lifting plate 117 which is provided with a lifting handle 120 cast integrally therewith. The lifting plate 117 is provided with a plurality of vertical through-holes, into which the upper end parts of the fuel rods 110 pass, the fuel rods thereby being positioned within the fuel channel 101. Some of the fuel rods are designed as support rods and these have longer upper end parts which pass right through the lifting plate 117 and are secured there from above by nuts 116. The lower end plugs of the support rods pass in similar manner, through a bottom tie plate and are again secured in place with nuts. In the same way as with the fuel assembly described in Santen et al. U.S. Pat. No. 3,697,375, the lower bottom tie plate is supported by a bottom part which is surrounded by the lower end of the fuel channel 101 and is fixed thereto by means of a plurality of horizontal bolts.

The top tie plate 117 has two vertically-extending, mutually identical posts 119, one provided in each of two diagonally located corners of the fuel assembly. These corners of the fuel channel 101 are each provided with a lug 123 which, in the same way as the lugs in the first and second embodiments of fuel assemblies described above, constitute extended corner portions of the fuel channel 101. Each lug 123 is provided with two rectangular openings 124, which are dimensioned in the same way as the coresponding openings 71 in the fuel assembly shown in FIG. 14. The horizontal projections 34 of the spacer 26 each make contact with the upwardly-facing surface of the respective post 119 and are fixed thereto by means of a threaded bolt 125 which is screwed into the post 119.

When a lifting force is applied to the handle 120, the lifting plate 117, the bottom tie plate and all the fuel rods are first lifted. When the projections 34 have been raised into contact with the upper edge of the holes 124, the fuel channel 101 and the bottom part attached thereto are also lifted. When the fuel rods are to be removed from the fuel channel 101, the spacer 26 is first removed, whereupon a lifting force applied to the handle 120 will extract the fuel rods 110 together from the fuel channel 101.

The part of this third embodiment of fuel assembly which is not shown in FIGS. 15 to 17 is designed in the same way as the corresponding part of the assembly shown in Suvanto et al. U.S. Pat. No. 3,697,375; issued on the Oct. 10, 1972.

In addition to the three embodiments of fuel assembly described above, the invention embraces a large number of embodiments not illustrated here. Thus, for example, the lifting plate or the handle attached thereto may be provided with holes into which the horizontal projections of the spacer are inserted simultaneously with being inserted into the holes provided in the walls of the fuel channel. Furthermore, it is not necessary to provide two through-holes in the fuel channel for each projection. One through-hole may be replaced by an embossed indentation or by a bracket-like, for example embossed, projection on the inner side of the fuel channel wall.

What is claimed is:

1. A fuel assembly comprising a plurality of fuel rods, a fuel channel having a first corner, a bottom tie plate means, a bottom part formed with a downwardlyfacing inlet opening for coolant, a spacer with a corner portion and two arms substantially at right angles extending from said corner portion, and lifting means surrounded by said fuel channel and provided with a lifting handle, said fuel rods being surrounded by said fuel channel and supported by said bottom tie plate means which in turn is supported by said bottom part, said lifting means being arranged in a tensile force-transmitting connection with said bottom tie plate means, said spacer being arranged with said corner portion at said first corner of said fuel channel and with each of said arms extending along a respective outer side of said fuel channel, said fuel channel being fixed to said bottom part and mechanical connections between said spacer and said lifting means and between said spacer and said fuel channel being provided by means of two radially extending projections, each of which is attached to and extends diagonally away from a corresponding one of said arms and passes through at least one corresponding aperture in a wall of the fuel channel to provide a tensile force-transmitting mechanical connection with said fuel channel, each projection extending diagonally away from its corresponding arm in a direction parallel to an imaginary, axially extending plane passing diagonally through said first corner of the fuel channel and being positioned for the most part inside the inner limiting surface of the fuel channel, said projections being fixed to said lifting means by means of a detachable mechanical connection means which is releasable from above the fuel assembly, and said spacer being detachable from said fuel channel by release of said detachable mechanical connection means and radial movement of said spacer relative to said fuel channel to withdraw said projections from said apertures.

2. A fuel assembly as claimed in claim 1, in which each projection passes through a respective first aperture formed in the respective walls of the fuel channel that extend away from the first corner and terminates in a respective second aperture formed in the respective adjacent walls of the fuel channel that are remote from the first corner.

3. A fuel assembly as claimed in claim 2, in which each first and second aperture provides clearance above the projection located therein, to allow upward movement of the projections in the apertures before said projections engage the wall portions defining the respective upper edges of the said apertures.

4. A fuel assembly as claimed in claim 1, in which the bottom part of the fuel assembly is fixed to the fuel channel by means of a plurality of horizontally directed fixing members.

5. A fuel assembly as claimed in claim 4, in which the fixing members are threaded bolts.

6. A fuel assembly as claimed in claim 1, in which the detachable mechanical connection means fixing each projection to the lifting means is a threaded member passing through the respective projection and threadedly engaged in the lifting means.

7. A fuel assembly as claimed in claim 6, in which the lifting means is a grid-like plate and is provided with upwardly extending posts into which the threaded members are threadedly engaged.

8. A fuel assembly for a boiling water reactor having a fuel channel of generally square cross-section and provided with four walls, two of said walls extending away from a first corner of the fuel channel and being provided with an aperture therein, a plurality of fuel rods contained within the fuel channel, a lifting plate and a lifting handle, a spacer having a corner portion and two arms extending from the corner portion, the corner portion of the spacer engaging said first corner of the fuel channel adjacent to its upper edge, and the two arms each making contact with the outer sides of the said two fuel channel walls that meet at the first corner, each arm being provided, at its outermost part, with a diagonally directed, radially extending projection which is inserted into a corresponding one of said apertures in the said two fuel channel walls so as to bridge across a respective one of the two corerns of the fuel channel which are closest to the said first corner and provide a tensile force-transmitting mechanical connection with said fuel channel, the two projections resting on the lifting plate provided with the lifting handle and each being fixed to the lifting plate by means of a fixing device which is releasable from above, and said spacer being detachable from said fuel channel by release of said detachable mechanical connection means and radial movement of said spacer relative to said fuel channel to withdraw said projections from said apertures.

* * * * *

UNITED STATES PATENT AND TRADEMARK OFFICE
CERTIFICATE OF CORRECTION

PATENT NO. : 4,707,328

DATED : November 17, 1987

INVENTOR(S) : Richard Arbrink and Olov Nylund

It is certified that error appears in the above-identified patent and that said Letters Patent is hereby corrected as shown below:

Title page Item (19) "Arbink et al" should read
-- Arbrink et al --

Title page Item (75) inventor's name should read
-- Richard Arbrink --.

Signed and Sealed this

Twelfth Day of April, 1988

Attest:

DONALD J. QUIGG

Attesting Officer

Commissioner of Patents and Trademarks